UNITED STATES PATENT OFFICE 2,676,184

1-HYDROXY - 7 - ISOPROPYL - 12 - METHYL- 1,2,3,4,9,10,11,12 - OCTAHYDRO -2- PHENAN- THRONE AND BENZOYL AND LOWER ALKANOYL ESTERS THEREOF

Willard M. Hoehn, Wilmette, Ill., assignor to G. D. Searle & Co., Chicago, Ill., a corporation of Illinois No Drawing. Application November 22, 1952, Serial No. 322,172

5 Claims. (Cl. 260—476)

The present application is concerned with a group of new octahydrophenanthrene derivatives and, specifically, with the 1-hydroxy, 1-alkanoyloxy and 1-benzoyloxy derivatives of 7-isopropyl - 12 - methyl - 1,2,3,4,9,10,11,12 - octahydro-2-phenanthrone. These compounds can be represented by the general structural formula

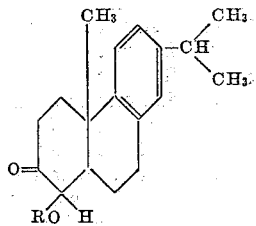

wherein R is hydrogen, benzoyl or a (lower alkyl)-CO— radical.

In the foregoing structural formula R can represent such lower alkanoyl radicals as acetyl, propionyl, butyryl, pentanoyl, hexanoyl, heptanoyl and octanoyl.

These compounds are valuable medicinal agents which are effective in correcting gonadal hormone deficiency. They are also of value in the synthesis of other medicinal compounds. Thus chromic acid oxidation leads to the conversion of the 9-methylene radical to a 9-oxo radical.

The following examples illustrate in detail certain of the compounds which constitute this invention and methods for preparing the same. However this invention is not to be construed as limited thereby in spirit or in scope since it will be apparent to those skilled in the art that many modifications in materials and methods may be practiced without departing from the invention. In each of these examples temperatures are given in degrees centigrade (° C.), relative amounts of materials in parts by weight, and pressures in millimeters (mm.) of mercury.

Example 1

A mixture of 400 parts of dehydroabietinol and 200 parts of boric acid is heated at 150° C. for an hour and then twice distilled at 0.025 mm. pressure and about 160–163° C. Additional yield can be obtained by thermal decomposition of the borate ester left in the distillation residue. The resulting 1-ethylidene derivative shows an ultraviolet absorption maximum at 264 millimicrons with a molecular extinction coefficient of 940, and at 276 millimicrons with an extinction coefficient of 868. A 1% chloroform solution shows a specific rotation $\alpha_D = +185°$.

A solution of 387.5 parts of this ethylidene derivative in 960 parts of chloroform and 1000 parts of carbon tetrachloride is ozonized at −50° C. in the course of 70 minutes so that 56.5 parts of ozone are absorbed. The reaction mixture is then dropped slowly into hot water and the organic layer is separated and freed from solvent by vacuum distillation. The residue is taken up in ether and washed successively with water, 1% aqueous sodium hydroxide solution and again with water to neutrality. The ether solution is dried over calcium sulfate, filtered and concentrated in vacuo. The residual light yellow oil is dissolved in 3500 parts of a 10% acetic acid solution in methanol. 360 parts of Girard's reagent "P" (pyridino-acetohydrazide hydrochloride) are added and the mixture is heated at reflux temperature for two hours and then poured over a mixture of 2000 parts of ice and 560 parts of 39% sodium hydroxide solution. The resulting solution is washed with ether, rendered acid by addition of concentrated sulfuric acid and ether extracted. The ether extracts are washed with water, dilute sodium hydroxide and finally with water to neutrality, dried over calcium sulfate and filtered. Vacuum distillation of the solvent yields a reddish-brown liquid which is taken up in petroleum ether and thus applied to a chromatographic column containing alumina.

Elution with petroleum ether and a solution of 2% benzene in petroleum ether yields the 7 - isopropyl - 12 - methyl - 1,2,3,4,9,10,11,12- octahydro-1-phenantrone which can be distilled at about 145–155° C. and 0.07 mm. pressure. This compound forms a crystalline semicarbazone which, recrystallized from 90% methanol, melts at about 227–228° C. The oxime melts at about 167–170° C. when crystallized from the same solvent. The 2,4-dinitrophenylhydrazone, crystallized from ethanol, melts at about 88–91° C. The 7 - isopropyl - 12 - methyl - 1,2,3,4,9,10,11,12- octahydro-1-phenanthrone has the structural formula

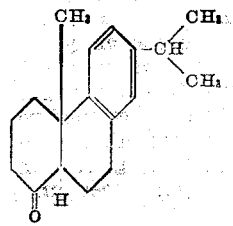

Example 2

A solution of 100 parts of 7-isopropyl-12-methyl - 1,2,3,4,9,10,11,12 - octahydro - 1 - phenanthrone in 400 parts of methanol is treated with 400 parts of a 4% solution of sodium methoxide in methanol and 105 parts of benzaldehyde. The mixture is shaken to distribute the reactants, heated slowly in the course of 10 minutes and then stripped of solvent in vacuo. Water is added, the mixture is made acid by addition of a 10% aqueous hydrochloric acid solution and then ether extracted. This extract is washed with water, dilute sodium hydroxide solution and then again with water to neutrality. The ether solution is dried over anhydrous sodium sulfate, filtered and solvent stripped in vacuo. On distillation the reaction mixture yields 42 parts of benzaldehyde in the first fraction. The 2-benzal-7 - isopropyl - 12 - methyl - 1,2,3,4,9,10,11,12 - octahydro-1-phenanthrone is collected at a pressure of 0.05 mm. and about 200–204° C. The ultraviolet absorption spectrum of the compound shows a maximum at about 290 millimicrons with a molecular extinction coefficient of 16,300. The compound has the structural formula

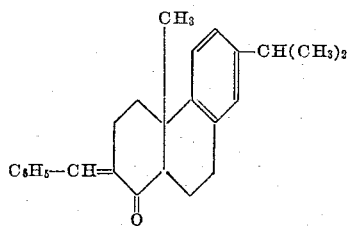

Example 3

A concentrated etheric solution of 36 parts of 2 - benzal - 7 - isopropyl - 12 - methyl - 1,2,3,4,9,-10,11,12-octahydro-1-phenanthrone is added to a solution of 30 parts of lithium aluminum hydride in 2500 parts of ether. The resulting mixture is heated at reflux temperature for 12 hours and then decomposed by the addition of 370 parts of ethyl acetate. Addition of 500 parts of water causes the metallic hydroxides to precipitate. The ether solution is separated, dried over anhydrous calcium sulfate, filtered and concentrated to yield the viscous 2-benzal-7-isopropyl 12 - methyl - 1,2,3,4,9,10,11,12 - octahydro - 1 - phenanthrol which has the structural formula

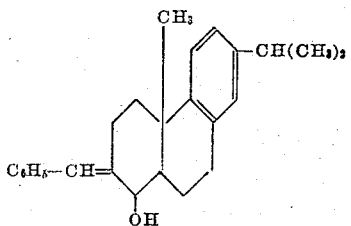

The ultraviolet absorption spectrum shows a well defined maximum at about 245 millimicrons.

Example 4

A solution of 13 parts of 2-benzal-7-isopropyl-12 - methyl - 1,2,3,4,9,10,11,12 - octahydro - 1 - phenanthrol in 250 parts of pyridine is treated with 32.5 parts of acetic anhydride and permitted to stand at room temperature for 2 days. It is then diluted with ice water and extracted with ether. This extract is washed with water, dilute hydrochloric acid solution, dilute sodium hydroxide solution and again with water to neutrality. After drying over anhydrous calcium sulfate, the ether solution is filtered and the solvent is evaporated in vacuo. The residue contains the 1-acetoxy-2-benzal-7-isopropyl-12-methyl-1,2,3,4,9,10,11,12-octahydrophenanthrene.

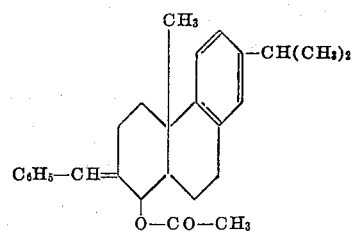

Example 5

Ozone is passed through a solution of 50 parts of 1-acetoxy-2-benzal-7-isopropyl-12-methyl-1,2,3,4,9,10,11,12-octahydrophenanthrene in 400 parts of carbon tetrachloride and 375 parts of chloroform at −50° C. until 26 parts are absorbed. The ozone is then displaced by oxygen and the solution is added to 200 parts of water and refluxed for 10 minutes. After vacuum distillation of the carbon tetrachloride and chloroform and water, the gummy residue is dissolved in ether. The ether solution is washed with aqueous sodium bisulfite and then with water to neutrality. After drying over sodium sulfate the ether solution is filtered and freed of solvent by vacuum distillation. The residue is treated with 40 parts of Girard's reagent "P" (pyridinoacetohydrazide hydrochloride) and 500 parts of a 10% acetic acid solution in methanol and heated at reflux temperature for one hour. It is then poured onto a mixture of 4000 parts of cracked ice and 120 parts of a 5 N sodium hydroxide solution. The non-ketonic fraction is extracted with ether. The aqueous layer is then rendered acidic by addition of a mixture of 183 parts of concentrated sulfuric acid and 1000 parts of ice and the ketonic fraction is extracted from the aqueous layer with ether. This ether extract is washed with dilute sodium bicarbonate solution and then with water. After drying over anhydrous sodium sulfate the ether solution is filtered and concentrated in vacuo. The 1 - acetoxy - 7 - ispropyl-12-methyl-1,2,3,4,9,10,11,12-octahydro-2-phenanthrone is obtained by vacuum distillation at about 0.03 mm. pressure and 145–146° C. The infrared spectrum shows maxima at 5.8, 6.0 and 8.1 microns. The ultraviolet spectrum shows a maximum at 276 millimicrons with a molecular extinction coefficient of about 2330. The compound has the structural formula

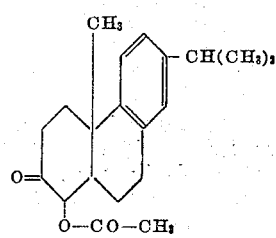

Example 6

A solution of 100 parts of 2-benzal-7-isopropyl - 12 - methyl - 1,2,3,4,9,10,11,12-octahydro-1-phenanthrol in 235 parts of pyridine is treated with 70 parts of benzoyl chloride for one hour and then diluted with 1500 parts of ether. The mixture is washed with water to remove the pyridine and then successively with dilute sodium carbonate, water, a saturated boric acid solution and again with water. The ether solution is dried over anhydrous calcium sulfate, filtered and evaporated in vacuo at a temperature not exceeding 40° C. The residual oil contains the 1 - benzoyloxy - 2 - benzal - 7 - isopropyl - 12 - methyl - 1,2,3,4,9,10,11,12 - octahydrophenanthrene which has the structural formula

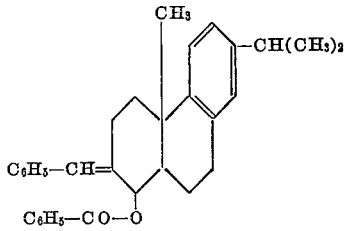

*Example 7*

A solution of 100 parts of 1-benzoyloxy-2-benzal - 7 - isopropyl - 12 - methyl - 1,2,3,4,9,10,11,12-octahydrophenanthrene in 2200 parts of dichloromethane is treated with a sufficient amount of ozone for the addition to one double bond at a temperature of about —50° C. The ozone is then displaced by oxygen and the reaction mixture is added slowly to 2000 parts of hot water. After steam distillation of the volatile material the residue is cooled and freed from water by decantation. The gummy residue is extracted with ether and this extract is washed successively with water, dilute aqueous sodium carbonate and water. After drying over anhydrous calcium sulfate the ether solution is filtered and concentrated in vacuo, leaving as a residue the 1-benzoyloxy-7-isopropyl-12-methyl-1,2,3,4,9,10,11,12 - octahydro - 2 - phenanthrone. The ultraviolet absorption spectrum shows a maximum at about 235 millimicrons and one at 276 millimicrons with a molecular extinction coefficient of 2900. The infrared spectrum shows a maximum at 7.81 microns. The compound has the structural formula

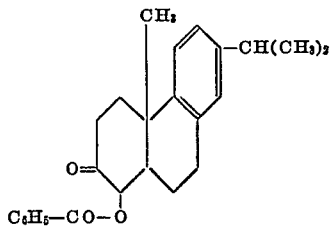

*Example 8*

A solution of 50 parts of 2-benzal-7-isopropyl-12 - methyl - 1,2,3,4,9,10,11,12 - octahydro - 1-phenanthrol in 1000 parts of dichloromethane is treated with 7.20 parts of ozone at —50° C. The ozone is displaced by oxygen and the reaction mixture is added slowly to 1000 parts of hot water. After steam distillation of the volatile material and decantation of water from the residue the remaining material is extracted with ether and the ether extract is washed successively with water, dilute aqueous potassium carbonate solution and again with water to neutrality. The extract is then dried over anhydrous calcium sulfate, filtered and stripped of solvent in vacuo, leaving a viscous residue containing the 1-hydroxy - 7 - isopropyl - 12 - methyl - 1,2,3,4,9,10,11,12 - octahydro - 2 - phenanthrone which shows infrared maxima at 282 and 585 microns and an ultraviolet maximum at about 276 millimicrons with a molecular extinction coefficient of about 1900. The compound has the structural formula

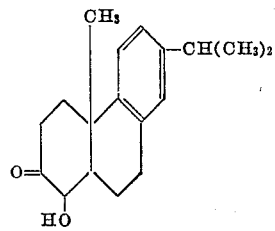

I claim:

1. A compound of the structural formula

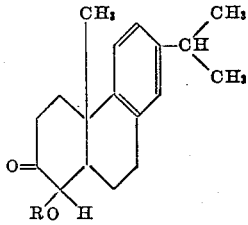

wherein R is a member of the class consisting of hydrogen, benzoyl and (lower alkyl)-CO— radicals.

2. 1 - hydroxy - 7 - isopropyl - 12 - methyl-1,2,3,4,9,10,11,12 - octahydro - 2 - phenanthrone.

3. 1 - (lower alkanoyloxy) - 7 - isopropyl - 12-methyl - 1,2,3,4,9,10,11,12 - octahydro - 2 - phenanthrone.

4. 1 - acetoxy - 7 - isopropyl - 12 - methyl-1,2,3,4,9,10,11,12 - octahydro - 2 - phenanthrone.

5. 1 - benzoyloxy - 7 - isopropyl - 12 - methyl-1,2,3,4,9,10,11,12 - octahydro - 2 - phenanthrone.

No references cited.